United States Patent [19]

Pallmann

[11] 4,218,024
[45] Aug. 19, 1980

[54] ADJUSTING DEVICE FOR THE CUTTING BLADES OF A CUTTING TOOL

[75] Inventor: Wilhelm Pallmann, Zweibrücken, Fed. Rep. of Germany

[73] Assignee: Pallmann KG Maschinenfabrik, Zweibrücken, Fed. Rep. of Germany

[21] Appl. No.: 968,615

[22] Filed: Dec. 11, 1978

[30] Foreign Application Priority Data

Dec. 9, 1977 [DE] Fed. Rep. of Germany ....... 2755000

[51] Int. Cl.² ............................................ B02C 13/26
[52] U.S. Cl. ............................... 241/188 R; 241/251; 241/259.2; 241/286; 144/218
[58] Field of Search ........................... 144/218, 162 R; 241/259.1, 259.2, 286, 239, 241, 188 R, 221, 251; 33/185 R; 29/464, 468

[56] References Cited

U.S. PATENT DOCUMENTS

| | | | |
|---|---|---|---|
| 3,827,643 | 8/1974 | Grube et al. | 241/221 X |
| 4,085,494 | 4/1978 | Sybertz et al. | 144/218 X |

*Primary Examiner*—Mark Rosenbaum
*Attorney, Agent, or Firm*—Becker & Becker, Inc.

[57] ABSTRACT

An adjusting device for the cutting blades of a cutting tool, especially of an annular cutting tool according to which the cutting blades have associated therewith at least one abutment which is adjustable for adaptation to the extent of the wear of wear plates or corresponding machine parts of the cutting tool. The device furthermore includes a setting device for adjusting the cutting blades so as to occupy their abutting positions.

17 Claims, 4 Drawing Figures

ADJUSTING DEVICE FOR THE CUTTING BLADES OF A CUTTING TOOL

The present invention relates to a device for adjusting the cutting blades of a cutting tool, especially of an annular cutting tool. A device of this type is intended in particular for cutting wood. When the cutter blades have worn, cutter blade packets comprising the cutter blades and the cutter blade holding plate are successively removed from the cutter ring, the cutter blades are ground, and the newly ground cutter blades together with the cutter blade holding plates are in the setting device set for a projection of the cutter blades which corresponds to the new condition of the cutting tool. In the meantime, cutter packets with new or newly ground cutter blades are inserted into the cutter ring. Therefore, for each cutter blade, a cutter blade holding plate has to be stocked. For setting the cutter blades relative to the cutter blade holders, longitudinal slots have to be provided in the plates, and the cutter blades, for connection to the cutter blade holding plates to form cutter blade packets, have to be provided with threaded bores for receiving corresponding screws. The great number of cutter blade holding plates to be stocked and the arrangement of threaded bores in the cutter blades cause rather high stocking and manufacturing costs. Inasmuch as with the setting of the protrusion of the cutter blades, the wear of the remaining wearing parts, especially of wear plates which are arranged adjacent the cutter blades in the circumferential direction of the cutter blade ring and which together with the cutting edges of the cutter blades respectively confine a gap which determines the thickness of the chip, is not taken into consideration, the gap may increase to such an extent that considerable differences in the thickness of the chip occur. Therefore, in order to avoid highly different or greatly different chip thicknesses, the gap has to be measured or checked at certain time intervals in order to correct the device or the protrusions of the cutting blades accordingly. This in turn requires considerable time and thus considerable expenses.

It is, therefore, an object of the present invention so to design an adjusting device of the above mentioned type that the projection of the cutter blades can be set in a simple manner and in conformity with the wearing condition of the wear parts of the cutter.

These and other objects and advantages of the invention will appear more clearly from the following specification in connection with the accompanying drawings, in which:

FIG. 1 diagrammatically illustrates a section taken along the line I—I of FIG. 2.

Figure 1:
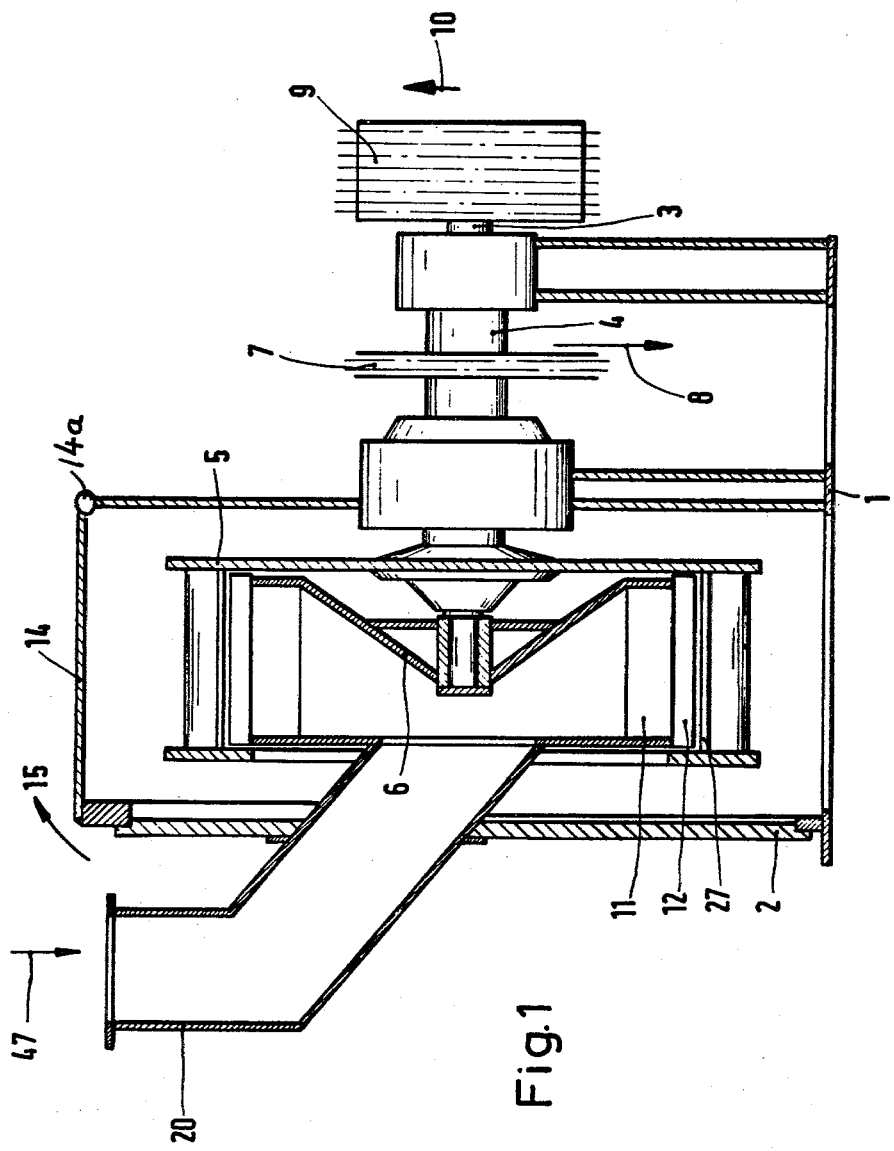

The setting device according to the invention is characterized primarily in that it comprises at least one abutment correlated with the cutting blades, which abutment for adaptation to the degree of wear of wear plates or corresponding machine parts of the cutter is adjustably mounted while at least one second adjusting device is provided for setting the cutter blades in their abutting position.

Referring now to the drawings in detail, the annular cutting tool according to FIGS. 1-4 has a housing 1 with a housing cover 2 at the end face thereof. A main shaft 3 is journalled in the housing 1 and is partially surrounded by a hollow shaft 4 while being frictionally connected to a cutter blade ring 5. The main shaft 3 has non-rotatably connected thereto a beater wheel 6. The cutter blade ring 5 and the hollow shaft 4 are driven by means of a V-belt drive in the direction indicated by the arrow 8 in FIG. 3. The beater wheel 6 and the main shaft 3 are driven by means of a chain drive 9 in the direction of the arrow 10 counter to the direction of rotation of the cutter blade ring 5. The beater wheel 6 comprises beater arms 11 which in circumferential direction are arranged one behind the other. The beater arms 11 are at their free ends equipped with beater strips 12 which are arranged opposite the cutter blades 27 of the cutter blade ring 5.

Figure 3:
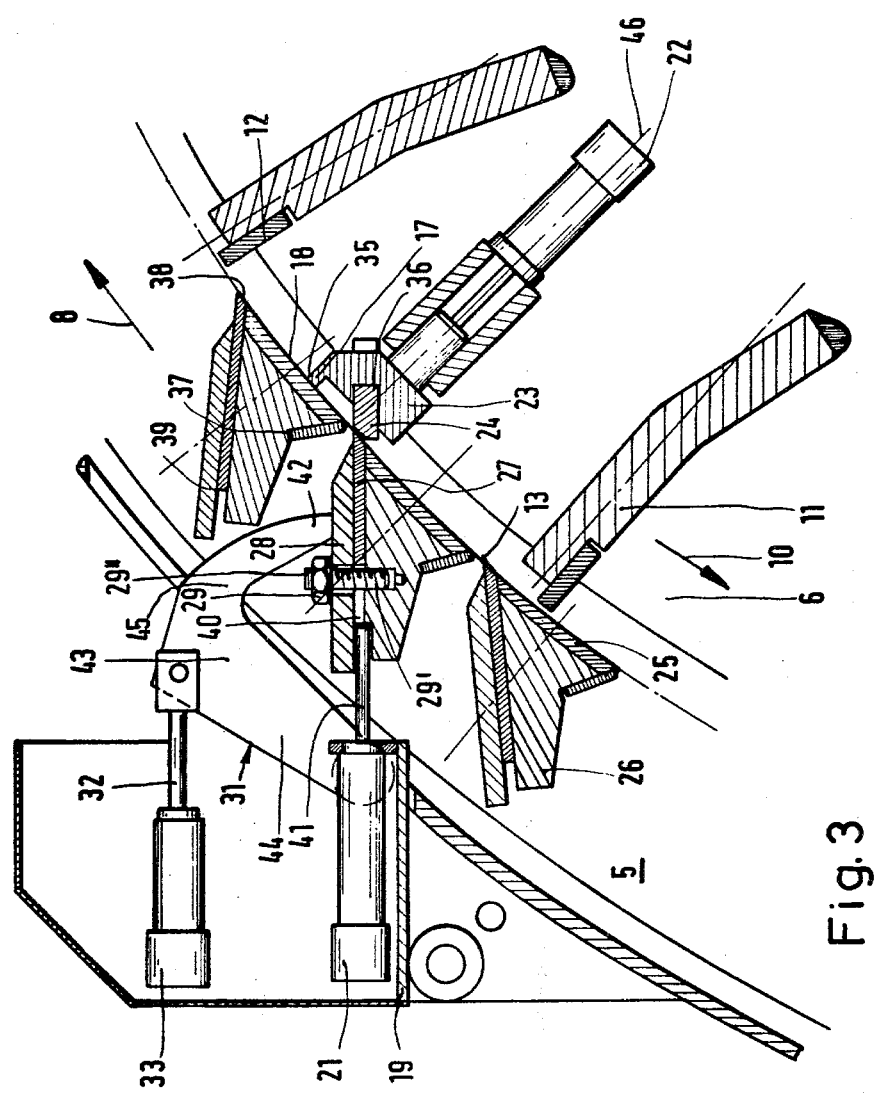
FIG. 3 shows the broken-out part of FIG. 2 on a larger scale than FIG. 2.
Figure 4:
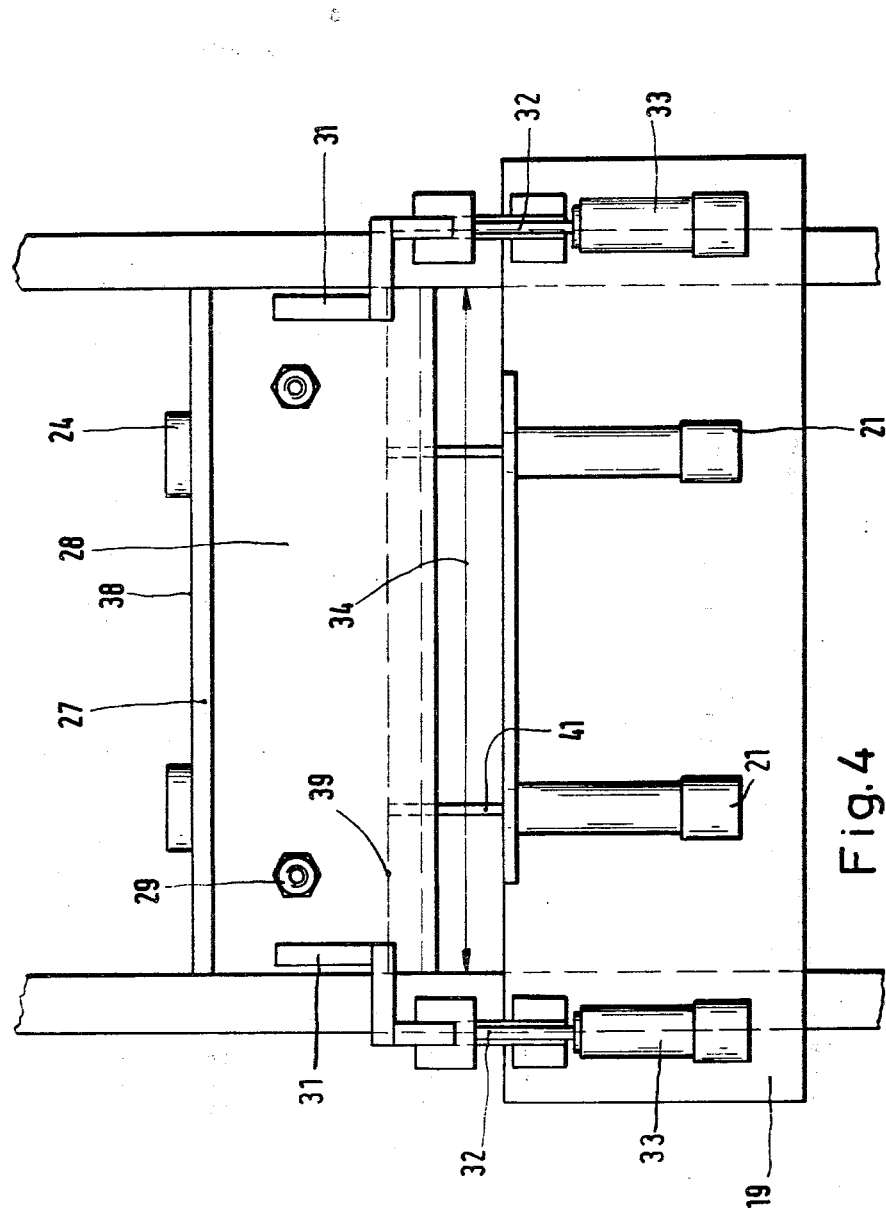
FIG. 4 is a top view of the cutter ring tool according to FIG. 3.

As will be evident from the drawings, particularly FIG. 3, the cutter blades 27 are by means of cutter blade plates screwed onto the cutter blade carriers 26 of the cutter blade ring 5.

For facilitating the exchange of cutter blades, the housing 1 has an upper lateral housing lid 14 which is adapted to be turned about the hinge 14a in the direction of the arrow 15. The material to be machined or chipped is fed to the beater wheel 6 through a chute 20 in the direction of the arrow 47. This material is by the arms 11 of said beater wheel 6 conveyed to the cutter blade ring 5. The material chipped by the cutter blades 27 is by means of the air current created by the beater wheel 6 conveyed into the inner chamber of the housing through the gaps between the cutter blade carriers 26 which are arranged one behind the other in the circumferential direction. The cutter blade carriers 26 have those end faces thereof which are located opposite the beater strips 12 provided with wear plates 25 which with their edges which are located opposite the blade cutting edges 38 confine one side of the intermediate gap 13. These plates are during operation exposed to a great wear so that the gap 13 will already after a relatively short time begin to increase whereby the chip thickness will increase correspondingly. In order to prevent this, the cutting blades 27 or more specifically the projection thereof relative to the cutter blade holding plates 28 have to be adapted to be changed in such a way that the gap widths independently of the degree of wear of the cutter blades 27 and of the wear plates 25 will always have the same magnitude. To this end, the cutter blades 27 when being exchanged by way of an adjusting means 21-24 are respectively reset relative to the cutter blade ring 5.

Figure 2:
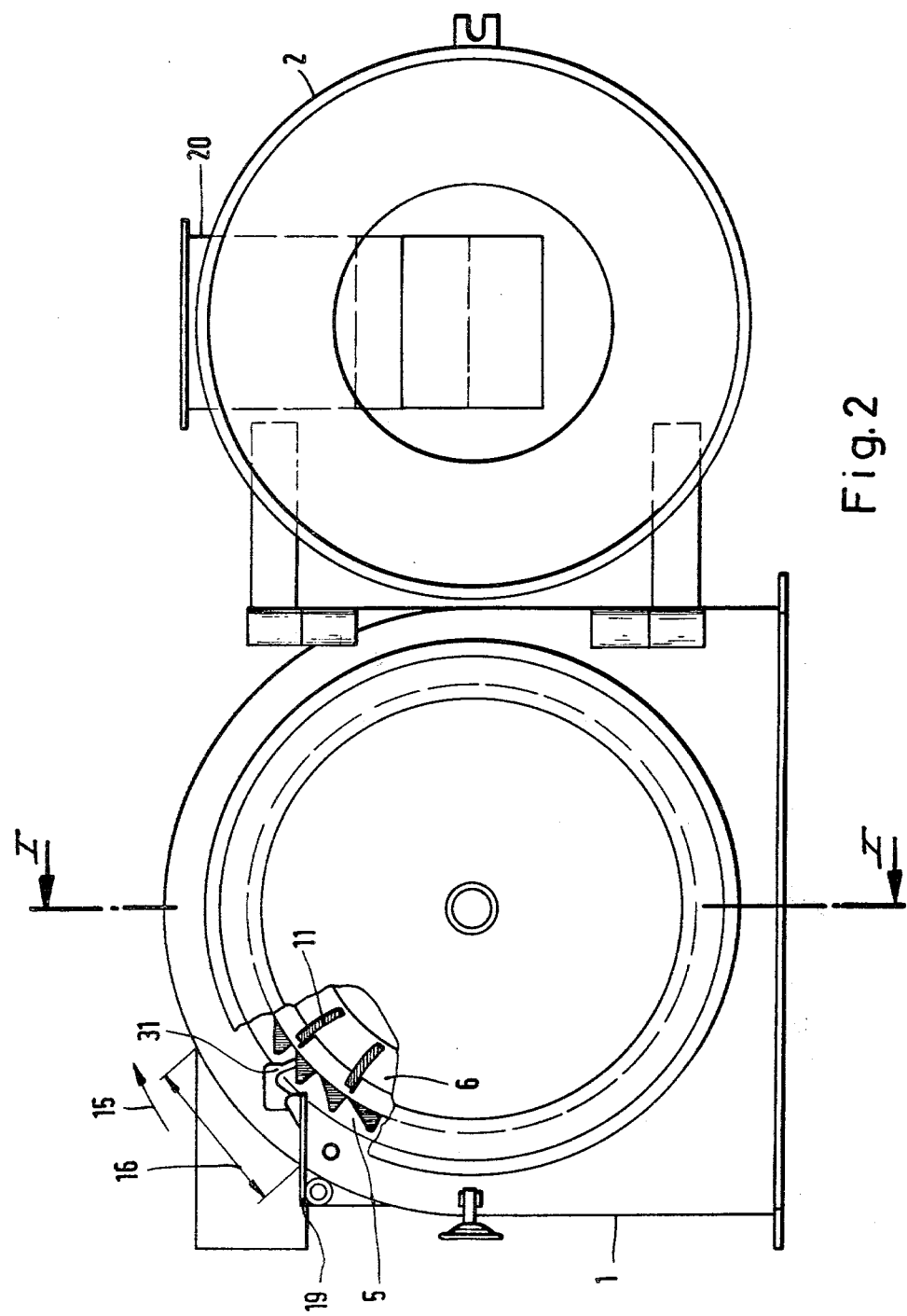
FIG. 2 shows a view of a cutter ring tool as seen from the material entry side and illustrating a cutter blade ring, a beater wheel, an opened housing cover and a setting device according to the invention, which setting device is connected to the housing of the cutter ring tool.

Prior to starting the cutter blade exchange, the beater wheel 6 is by a locking device which with known technical means acts upon the driving disc 9, stopped as if arrested by a corresponding (not illustrated) arresting lever, and thereupon the housing cover 2 and lid 14 are opened. The lid 14 when pivoted in the direction of the arrow 15 permits access to the cutting blades 27 so as to allow an exchange thereof. The space freed by the lid 14 has a clear width 34 (FIG. 4) and a width 16 (FIG. 2). A first setting device 22 is included with the adjusting means 21-24 and is provided with corresponding holding means not illustrated in detail such as screws or the like is rigidly connected to an arm 11 of the beater wheel 6. The first setting or adjusting device 22 comprises a hydraulic piston cylinder arrangement. Arranged on the end face of the piston of the first setting or adjusting device 22 is a traverse 23 which serves as bearing for two abutment members 24. The traverse 23 has an about rectangular cross section, and one longitudinal rim thereof has an extension 17. The extension 17 projects in the direction of the wear plates 25 and has an end face 35 which serves as supporting surface and by means of which the traverse 23 for adjusting the cutter blade 27 rests against pertaining inner surfaces 18 of the wear plate 25. At about half its width, the traverse 23 has two grooves 36 arranged adjacent to each other. These grooves respectively are equally spaced from the longitudinal central plane of the cutter. The grooves 36, the abutment members 24 are frictionally arranged and are screwed to the traverse 23. The abutment members 24 have a rectangular cross section with an upper inclined surface 37 which faces the cutting edges 38 of the cutter blades. The cutting blades 27 when occupying their end position rest against said upper inclined surface 37.

The longitudinal central plane of the abutment members 24 is located at an incline, preferably at an angle of more than 90° with regard to the axis of the first setting or adjusting device 22 and parallel to the longitudinal central plane of the cutting blades 27.

The non-illustrated lock at the driving disc 9 keeps the beater wheel 6 in its holding position until the dulled cutting blades 27 have been exchanged for new or newly ground cutting blades and are connected to the cutter blade carriers 26.

A second or further adjusting or setting device 21 is included with the adjusting means 21-24 and is pivoted into the working chamber 16,34 which is freely accessible when opening the housing lid 14. The adjusting device 21 is connected to a support 19 on the outside of housing 1 of the cutter. When in working position, the axis of the second or further adjusting device 21 included with is about perpendicular to the inclined surface 37 of the abutment members 24. This adjusting or setting device 21 likewise comprises a hydraulic cylinder piston arrangement. When in working position, the said adjusting or setting device 21 is held by means of screws, handles or other connecting elements. After the first dull cutting blade 27 has been removed, a sharp cutting blade is placed on the cutting blade carrier 26, and a cutting blade holding plate 28 is placed upon the cutting blade 27. The plate 28 can at its marginal areas by means of two screws 29' and pertaining nuts 29 together be screwed onto the cutting blade carrier. The screws 29' project through a pertaining bore 29" in the cutting blade holding plates 28 and pertaining oblong holes 40 in the cutting blades 27. First the screws 29' are tightened only to such an extent that the cutting blade 27 is in its oblong holes 40 still displaceable relative to the cutting blade holding plate 28 and the cutting blade carrier 26. The longitudinal axis of the oblong holes 40 is approximately aligned with the axis of the first adjusting or setting device 22. When occupying its working position, the piston rod 41 of the second adjusting device 21 presses in vertical direction against the rim 39 of the cutting blade 27 to be set whereby the blade 27 is displaced in the direction toward the first adjusting device 22. The first adjusting device 22 is moved outward to such an extent that the supporting surface 35 of the extension 17 of the traverse 23 rests against the inner surface 18 of the pertaining wear plate 25. The first adjusting device 22 is so connected to the beater arm 11 that the cutting blade 27 when being displaced into its end position will have its cutting edge 38 engage the inclined surface 37 of the abutment members 24. In this position, the screw 29' is by means of the nut 29 tightened to such an extent that the cutting blade 27 can no longer be displaced relative to the cutting blade holding plate 28. In this way, each newly inserted cutting blade 27 will always project to the same extent relative to the pertaining wear plate 25 by means of which it confines the intermediate gap 13. The respective equal sized intermediate gap 13 will assure that the chip material to be machined will always have the same chip thickness.

In order to prevent the cutting blade edge during the displacement of the blade 27 by means of the second adjusting device 21 from being displaced along the inclined surface 37 in upward direction toward the abutment members 24, two down-holders 31 are provided which by means of their free edge 42 press upon the holding plate 28 of the blade 27 to be set.

The down-holders 31 are when viewed in side view according to FIG. 3 approximately hook shaped and, in top view according to FIG. 5 are within the region of its end part 45 which faces toward the first adjusting device, offset in the direction toward each other. The down-holders 31 are within the region outside the working chambers 16, 34 pivotally connected to the housing 1 of the cutter. The pivot axis of the down-holders which is located approximately at the level of the axis 46 of the second adjustable device 21 and perpendicular to the device. Within the region of its transition section 43 between the offset end portion 45 and the connecting part 44 comprising the pivot axis, the down-holders are connected to the piston rods 32 of third adjusting devices 33. The adjusting devices 33 again comprise hydraulic cylinder piston arrangements, the axes of which are parallel to the axes of the second adjusting devices 21. The third adjusting devices 33 have their axes perpendicular to the pivot axis of the down-holders 31 laterally adjacent and above the second adjusting devices 21. For purposes of setting the respective cutting blades 27, the third adjusting devices 33 are actuated while the piston rod 32 is displaced in the direction of the first adjusting device 22 until the down-holders 31, due to the pivoting around their pivot axis rest upon the holding plate 28 and exert a counter-pressure thereon which couterpressure holds the blades 27 in engagement with the abutments 24.

The cutting blades 27 with their holding plates 28 are on both sides of the longitudinal central plane of the blades 27 screwed onto the blade carriers 26. In order to make sure that the blades 27 can over their entire length be properly set relative to the wear plates 25 and can be uniformly displaced, respectively two first and two second adjusting devices 21 and 22 are provided which are symmetrically arranged with regard to the longitudinal central plane of the cutter. The axes of these adjusting devices are located in a common axial plane of the cutter. In view of the connection of the down-holders 31 outside the working chambers 16, 34 and the angled-off end portions 45, the down-holders which are one-arm levers will not interfere with the exchange and reinsertion of the blades.

The down-holders may also from all other directions be pivoted in the direction toward the blade holding plate 28 so that the axes of the third adjusting devices 33 do not have to be parallel to the axes of the second adjusting devices 21.

Instead of the hydraulic adjusting devices, pneumatically, electrically, or mechanically operable adjusting devices or other setting, adjusting or displacing devices may be employed.

After the blade projection of the first blade 27 has been set in the above described manner, the adjusting devices 21, 22 and 33 are moved in while the supporting surface 35 of the traverse 23 and the inclined surface 37 of the abutment members 24 are lifted off the cutting edge of the blades, and the piston rods 41 of the second adjusting devices 21 are lifted off the rim 39 of the blades. Simultaneously, the down-holders 31 are lifted off the cutting blade holding plate 28 and are pivoted in a direction opposite to that of the first adjusting devices 22 to such an extent that their free ends 42 are located outside the mantle surface of the cutting blade 25. Subsequently, the cutting blade ring is turned to such an extent that the second blade is located at the level of the inclined surface 37 of the abutment members 24 of the first adjusting device 22. Subsequently, the blade screw connection of the blade is loosened so that the blade 27 can be exchanged for a new one. The adjusting devices 21, 22 and 33 are again actuated while the new blade 27 is displaced to its respective position toward the pertaining wear plate 25, in which position the same chip thickness will be assured.

Inasmuch as the first adjusting device 22 during the setting operation has its supporting surface 35 of extension 17 resting against the wear plate 25, it will be appreciated that with the adjustment of blade 27, the degree of wear of the wear plate 25 is taken into consideration. As a result thereof, expensive control measurements are superfluous so that the post adjustment of the blade 27 can be effected in a simple manner and in a short time. Due to the above description of the setting or adjusting device, the gap 13 has the same width independently of the wear condition of the wear plates 25 so that always a uniform chip thickness will be assured.

Advantageously, the setting device according to the invention may by means of the first to the third adjusting devices 21, 22 and 33 be mounted on a non-illustrated stand which is suitable on a certain working place provided for the exchange of the blades and for mounting the cutter blade ring 5. The device may also be connected to a non-illustrated carriage or the like for the cutting blade ring. Mounted on the framework or the transport carriage are adjusting devices in their working position so that after moving the cutter blade ring to the adjusting devices, the latter can immediately be actuated. By means of such a device, all blades 27 can outside the cutter respectively be set relative to the wear plates 25 in such a way that they will equally project beyond the wear plates. A connection of the adjusting devices 21, 22 to a framework or transporting carriage furthermore has the advantage that the idling time of the cutter during the blade exchange can be reduced by the time necessary for connecting the second adjusting device to the pertaining beater arm.

As will be evident from the above, by means of the adjusting device according to the invention, the blades are automatically so set that they will be respectively spaced from the edge of the pertaining wear plate which edge confines the said gap. As a result thereof, there is always a uniform chip thickness assured without the necessity of effecting control measurements and new adjustments of the device. Inasmuch as the blades in the blade carrying ring have to be set relative to the blade holding plates, they are not combined to form blade packets so that it is not necessary to keep stock for each blade of a blade holding plate. The stock costs are thereby considerably reduced. Since the blades and the pertaining blade holding plates are not connected to form blade packets, no threaded bores are necessary in the blades, the manufacture of which would otherwise require high precision and thereby be costly.

It is, of course, to be understood that the present invention is, by no means, limited to the specific showing in the drawings, but also comprises any modifications within the scope of the appended claims.

What I claim is:

1. An adjusting device including a housing with cutting blades of a cutting tool having a cutting blade ring carrying the cutting blades rotatably arranged in the housing and also provided with wear elements, the improvement in combination therewith which comprises: at least one abutment associated with the cutting blades to be adjusted and adjustable so as to be adapted in comformity with the wear of said wear elements, and at least one setting device for adjusting the cutting blades of the cutting tool so that they will abut said at least one abutment.

2. An adjusting device in combination according to claim 1, in which said at least one abutment is positively arranged in a bearing provided with a supporting surface for resting against the wear element of the cutting blade ring therewith.

3. An adjusting device in combination according to claim 2, which includes at least one further setting device operatively connected to said bearing for adjusting the latter.

4. An adjusting device in combination according to claim 3, in which the axis of said further setting device extends at about a right angle of said supporting surface of said bearing.

5. An adjusting device in combination according to claim 1, in which said at least one setting device includes a fluid operable cylinder-piston system for setting the respective pertaining cutting blade.

6. An adjusting device in combination according to claim 1, for a cutting tool comprising cutting blade carrier means for supporting the cutting blades and also comprising cutting blade holding plates for holding the cutting blades against the cutting blade carrier means, which includes at least one down-holder for exerting down-holding pressure upon the cutting blade holding plates.

7. An adjusting device in combination according to claim 6, in which said at least one down-holder comprises a pivotally mounted one arm lever.

8. An adjusting device in combination according to claim 6, in which said at least one down-holder in side view has an inverted V-shape.

9. An adjusting device in combination according to claim 6, in which said at least one down-holder has a free end and in top view within the region of said free end is angled off in an about L-shaped manner.

10. An adjusting device in combination according to claim 6, which includes a second fluid operable cylinder-piston system operatively connected to said at least one down-holder for actuating same.

11. An adjusting device in combination according to claim 10, in which said second fluid operable cylinder-piston system is located laterally outside and above said setting device.

12. An adjusting device in combination according to claim 6, in which said at least one down-holder is pivotable about an axis arranged at about the level of said first setting device.

13. An adjusting device according to claim 1, in which each cutting blade has two setting devices operatively associated therewith.

14. A cutting tool which includes in combination: a housing having at least one cover pivotally connected to said housing, a cutting blade ring rotatably arranged in said housing and also provided with wear elements, a plurality of cutting blades supported by and arranged in spaced relationship to each other around the circumference of said cutting blade ring, a beater wheel rotatably arranged within said cutting blade ring, and provided with beater arms distributed in spaced relationship to each other around the circumference of said beater wheel, and adjusting means associated with said housing for adjusting said cutting blades to compensate for wear thereof as provided with the wear elements, said adjusting means including at least one abutment means for abutment with the cutting edge of said cutting blades.

15. A cutting tool in combination according to claim 14, in which said adjusting means includes a setting device provided with connecting means for detachably connecting said last mentioned setting device to one of said beater arms of said tool, said setting device being operable to adjust said abutment means.

16. A cutting tool in combination according to claim 14, in which said adjusting means include an additional setting device for adjusting the cutting blades, said additional setting device being pivotably arranged on the outside of said housing.

17. A cutting tool in combination according to claim 14, which includes cutting blade carriers for supporting the cutting blades, and also includes down-holder means for holding the cutting blades against the cutting blade carriers, said down-holder means including down-holder members pivotably connected to the outside of said housing and pivotable in a region outside said cutting blades.

* * * * *